J. W. CANTY.
LOCKING AND SEALING DEVICE FOR FRICTION CLUTCHES.
APPLICATION FILED JAN. 6, 1916.

1,208,478.

Patented Dec. 12, 1916.

Witnesses

Inventor
John W. Canty,
by
Attorney.

UNITED STATES PATENT OFFICE.

JOHN W. CANTY, OF OSKALOOSA, IOWA.

LOCKING AND SEALING DEVICE FOR FRICTION-CLUTCHES.

1,208,478. Specification of Letters Patent. Patented Dec. 12, 1916.

Application filed January 6, 1916. Serial No. 70,670.

*To all whom it may concern:*

Be it known that I, JOHN W. CANTY, a citizen of the United States, residing at Oskaloosa, in the county of Mahaska and State of Iowa, have invented new and useful Improvements in Locking and Sealing Devices for Friction-Clutches, of which the following is a specification.

This invention relates to a lock attachment applicable to clutches whereby an adjustable member designed to vary the pressure exerted upon the clutch members thereof may be permanently locked and sealed in desired positions and thus maintain a constant pressure of the force-exerting element upon the clutch members despite the vibration and operation of the various parts of the clutch.

The object of the invention is to provide a simple lock attachment for clutches of the type hereinafter described which consists of few parts and which may be readily applied.

The invention consists in a certain novel construction, combination and arrangement of parts which will be hereinafter more fully pointed out in the appended claims.

Figure 1:
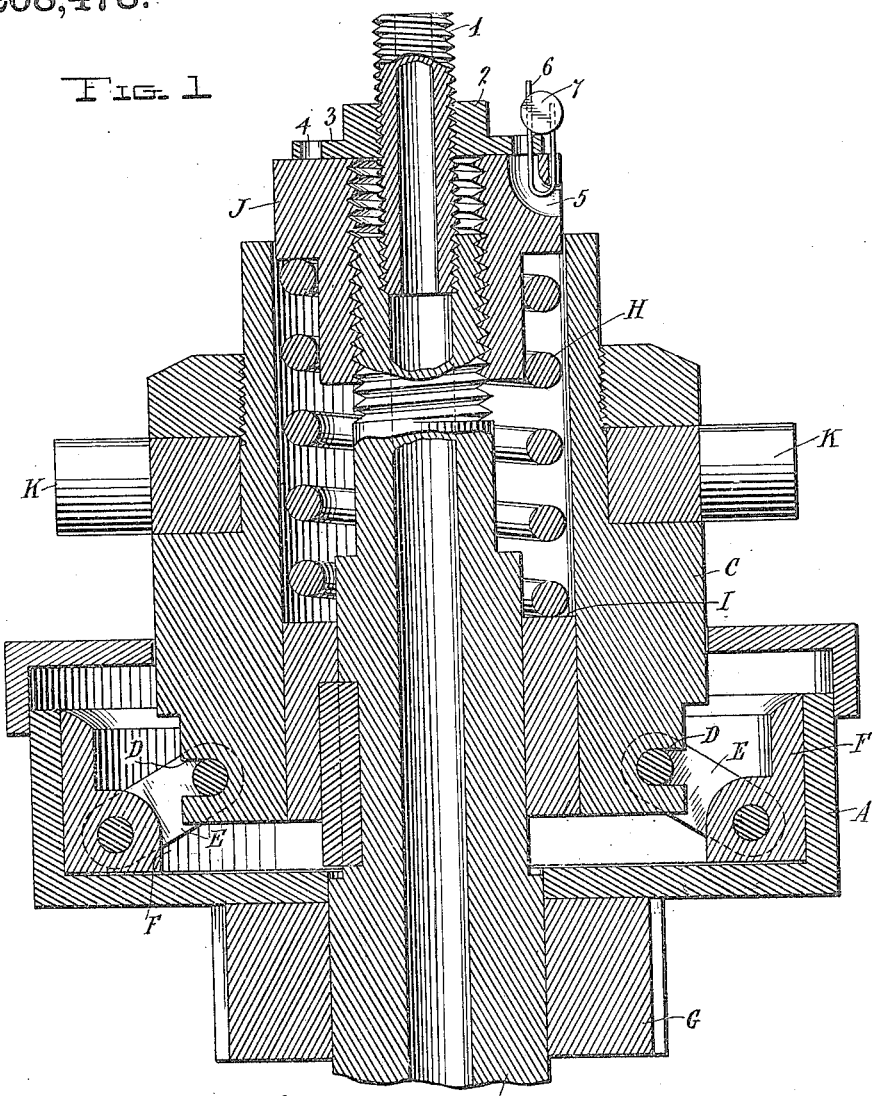
Figure 2:
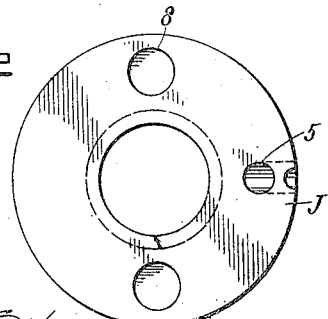
Figure 3:
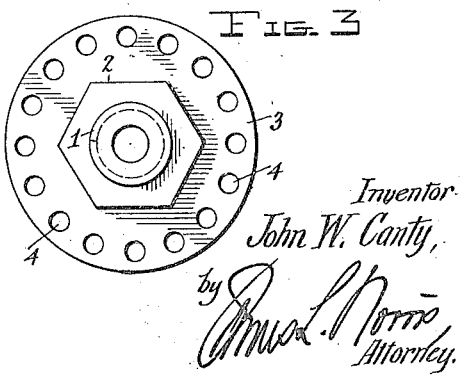

In the drawings which form part of the specification: Figure 1 is a longitudinal sectional view through a clutch of the type for which said attachment is designed, showing the latter applied thereto; Fig. 2 is a plan view of a pressure adjusting member or nut forming a part of the construction of the clutch; and Fig. 3 is a plan view of the attachment for the clutch.

Like reference characters denote like parts throughout the specification and drawings.

The lock attachment is specially designed for use in connection with clutches having the clutch members thereof mounted on a hollow shaft, which latter has surrounding the same a helical spring adapted to exert pressure upon the the clutch members, which pressure may be varied by an adjustable nut or other suitable member mounted on the shaft. For the purpose of illustration, a clutch has been shown comprising a shell member A loosely mounted on the hollow shaft B and a head member C slidably mounted on said shaft. The lower end of the head C is formed with a plurality of slots or recesses D each adapted to receive one end of one of the links E which have their other ends pivotally attached to the sectional frictional ring F which is brought into contact with the inner side of the shell A when it is desired to impart motion to the driving pinion G. The outer end of the bore of the head C surrounding the shaft B is enlarged to accommodate the helical spring H surrounding the shaft B, one end of the spring bearing against the shoulder I of the head C and the other end against the nut J threaded on the upper or outer end of the shaft B. It will thus be seen that by threadingly adjusting the nut J on the shaft, the pressure exerted upon the head C by the spring H may be varied, as desired, and consequently the pressure of the frictional engagement of the sectional ring F with the shell A may be varied. Trunnions K are mounted on the head C and are suitably connected with an operating lever controlling the operation of the clutch.

The specific construction of the above-described clutch forms no part of the invention but is shown and described in order that the application and use of the invention may be fully understood.

In carrying the invention into practice, the hollow shaft B has its outer end internally threaded to receive the sleeve or hollow nipple 1, which forms an extension of said shaft. The nipple has a longitudinal bore forming a continuation of the bore of the shaft and which is provided for lubrication purposes. The threads on the nipple 1 are oppositely disposed to those on the end L of the shaft B; in other words, if the end of the shaft is provided with right-hand threads, the nipple 1 will be formed with left-hand threads or vice versa. The nut 2 is mounted on the threads of the nipple 1 and is formed with a laterally extending, annular flange or washer portion 3 formed with axially extending perforations 4 adjacent its periphery.

After the spring-adjusting nut J has been moved to a position for exerting the desired force upon the clutch head C, the lock nut 2 is tightly screwed down to engage with the outer end of the pressure-adjusting nut J. It will thus be observed that the lock nut 2 will prevent any movement of the nut J which would tend to reduce the force of the spring H and which might be caused by the pressure of said spring upon the inner end of the nut J and the vibration set up in the machine by the movement of its parts or otherwise. The perforations 4 in the flange 3 of the lock nut permit the same to be sealed in set position with the pressure-adjusting member J, in which event, the latter is milled and provided with a bore or passage 5 having its walls curved so that the thread or wire 6 of the seal may be guided therethrough. The passage 5 of the nut J is of elbow formation and extends from the top of the nut through to one side thereof, the perforations 4 being adapted to be brought to register with one end of the passage 5 as the nut 2 is rotated on said nipple. The sealing means may consist of a thread or wire 6 having its opposite ends secured by the usual lead seal 7. Now, to set the clutch to any desired pull, the nut lock 2 is removed and the pressure-adjusting member J is threaded upon the shaft B by inserting a pin wrench, or the like tool into the recesses 8 provided in the top surface thereof. After the desired pressure has been obtained, the lock nut may be again threaded to engage with the top of the nut J and sealed in the manner above described. When the pressure-adjusting member is not sealed a careless or indifferent operator may destroy the efficiency of the machine by lessening the pull of the clutch or overload the machine by increasing the pressure of the clutch to the point of breaking some part of the machine.

It is to be understood that such changes in the specific construction and arrangement of parts of the lock attachment for clutches may be resorted to as fall within the scope of the appended claims.

I claim—

1. In a lock attachment for clutches having a shaft and an adjustable member for varying the clutch engaging force acting upon the clutch members, a threaded nipple adapted to be attached to said shaft and form a continuation thereof, and a nut threaded on said nipple and movable into locking engagement with said adjustable member.

2. In a lock attachment for clutches having a shaft and an adjustable member for varying the clutch engaging force acting upon one of the clutch members, a threaded nipple adapted to be threaded in said shaft and form a continuation thereof, a nut threaded on said nipple and movable into locking engagement with said adjustable member, and means for sealing said nut and adjustable member together.

3. In a lock for clutches, having a hollow shaft upon which the clutch members are mounted and a threaded member on the shaft for varying the clutch engaging force acting upon one of said clutch members, a threaded nipple formed with a logitudinal bore and adapted to be threaded in the bore of said hollow shaft to form an extension of the latter, and a lock nut threaded on said nipple in a direction opposite to the threading of said adjustable member and adapted to be moved into locking engagement with the latter.

4. In a lock attachment for clutches, the combination with a hollow shaft upon which the clutch members are mounted and a threaded member on the shaft for varying the clutch engaging force acting upon one of said clutch members and formed with a passage therethrough, of a threaded nipple formed with a longitudinal bore and adapted to be threaded in the bore of said hollow shaft to form an extension of the latter, a lock nut threaded on said nipple in a direction opposite to the threading of said adjustable member and adapted to be moved into locking engagement with the latter, said lock nut having a series of perforations therein adapted to register with the passage in said threaded member as the lock nut is rotated, and a sealing thread extending through said passage and its registering perforation for securing said lock nut and threaded member together.

5. In a lock attachment for clutches, the combination with a shaft and an adjustable member for varying the clutch engaging force acting upon the clutch members, of a nipple to be threaded on said shaft to form a continuation thereof, and a nut threaded on said nipple and movable into locking engagement with said adjustable member.

In testimony whereof I have hereunto set my hand in presence of two subscribing witnesses.

JOHN W. CANTY.

Witnesses:
E. A. SCHMIDT,
FRANK A. NASH.